United States Patent
Van Kesteren et al.

(10) Patent No.: US 6,925,033 B2
(45) Date of Patent: Aug. 2, 2005

(54) MAGNETIC HEAD WITH A PERMANENT-MAGNET LAYER STRUCTURE

(75) Inventors: Hans Willem Van Kesteren, Eindhoven (NL); Paulus Wilhelmus Maria Blom, Zuidhorn (NL); Jeroen Jan Lambertus Horikx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 610 days.

(21) Appl. No.: 09/995,469

(22) Filed: Nov. 28, 2001

(65) Prior Publication Data

US 2002/0110082 A1 Aug. 15, 2002

(30) Foreign Application Priority Data

Feb. 12, 2001 (EP) .......................................... 01200477

(51) Int. Cl.⁷ .............................................. G11B 11/00
(52) U.S. Cl. ..................................... 369/13.23; 369/300
(58) Field of Search ............................ 369/13.14, 13.23, 369/13.55, 13.17, 13.05, 13.18, 13.19, 13.2, 300, 13.5, 13.51; 360/123, 126

(56) References Cited

U.S. PATENT DOCUMENTS

| | | | |
|---|---|---|---|
| 5,886,959 A | 3/1999 | Bischoff et al. | 369/13.23 |
| 5,903,525 A | 5/1999 | McDaniel et al. | 369/13.23 |
| 5,978,319 A * | 11/1999 | Wang et al. | 369/13.23 |
| 6,477,118 B1 * | 11/2002 | Awano et al. | 369/13.14 |
| 6,628,604 B2 | 9/2003 | Van Kesteren et al. | 369/300 |
| 6,724,694 B2 * | 4/2004 | Knight et al. | 369/13.55 |

* cited by examiner

Primary Examiner—Ali Neyzari
(74) Attorney, Agent, or Firm—Edward W. Goodman

(57) ABSTRACT

For high-resolution and low bit-error-rate MAMMOS readout, a magnetic head includes a flat magnetic coil (1) having a coil layer structure (3a, 3b) having an electrically conductive winding (5a, 5b), and includes a permanent-magnet layer structure (7) extending parallel to the coil layer structure and having an in-plane magnetic axis (m).

15 Claims, 4 Drawing Sheets

MAGNETIC HEAD WITH A PERMANENT-MAGNET LAYER STRUCTURE

BACKGROUND OF THE INVENTION

1. Field of the Invention

The invention relates to a magnetic head including an at least substantially flat magnetic coil having at least one coil layer structure comprising an electrically conductive winding. The magnetic head is especially meant for use in a magneto-optical device.

2. Description of the Related Art

An embodiment of such a magnetic head is disclosed in International Patent Application No. WO-A 98/48418, corresponding to U.S. Pat. Nos. 5,886,959 and 5,903,525. The magnetic head known from this PCT document includes a flat magnetic coil having two parallel coil sections, each coil section comprising a plurality of windings formed by means of a thin-film technology. The magnetic coil extends in a magnetic yoke which, with the coil, defines a central passageway for an optical beam. The known magnetic head is intended for use in a magneto-optical (MO) system for the storage of data in a magneto-optical (MO) medium comprising a recording layer, the magnetic head being situated at a short distance from a main face of the MO medium during the recording or reading of data. Such a magneto-optical system comprises, apart from said magnetic head, a laser source and optical elements, which include a focusing lens, enabling a laser beam to be routed to a recording layer via the central passageway. During the storage of data, the laser beam is utilized for reducing the coercivity of the recording layer of the MO medium, in that selected spots are heated to approximately the Curie temperature of the recording layer. Meanwhile, the magnetic coil is activated to generate a time-varying magnetic field traversing the recording layer in order to define a pattern of magnetic domains. During reading-out of stored information, the MO medium is scanned with the laser beam, use being made of the magneto-optical Kerr effect which is known per se.

During the magneto-optical storage of information, the minimum width of the stored data bits is dictated by the diffraction limit, i.e., the numerical aperture (NA) of the focusing lens used and the wavelength of the laser beam emitted by the laser source.

A reduction of said width is generally based on shorter-wavelength lasers and higher-NA optical focusing systems. During magneto-optical recording, the minimum bit length can be reduced to below the optical diffraction limit by using Laser Pulsed Magnetic Field Modulation (LP-MFM). In such a process, the bit lengths are determined by the pulsing rate of the laser in combination with the alternating magnetic field. For reading the small marks recorded in this way, use is made of magnetic super resolution (MSR) technologies, including Domain Expansion methods, like MAMMOS, based on media with magnetostatically coupled layers. An advantage of Domain Expansion methods is that marks with a length below the diffraction limit can be detected with a similar signal-to-noise ratio, as marks with a size comparable to the diffraction limited spot.

A magnetic amplifying magneto-optical (MO) system, called MAMMOS, is described in the IEEE Journal of Selected Topics in Quantum Electronics, Vol. 4, No. 5, September/October 1998, pages 815–820.

The concept of MAMMOS is to realize a signal enhancement by using magnetic-domain expansion at the readout time. Use is made of a storage medium comprising a storage layer and readout layer magnetostatically coupled to each other. During readout, a laser beam heats the medium at the readout position. When a mark in the storage layer, i.e., a bit with a magnetization direction opposite to the initial magnetization direction of the readout layer, is within an area called the copy window, where the temperature is high enough to enable magnetization reversal, a domain is nucleated in the readout layer. An external magnetic field is applied for expansion of this domain, the field being reversed to collapse the domain after detection of the domain.

The coil used in the magnetic head known from said WO-A 98/48418 has a limited readout resolution when applied in combination with MAMMOS.

SUMMARY OF THE INVENTION

It is an object of the invention to provide a magnetic head which increases the readout resolution by the use of a Domain Expansion technology based on magnetostatically coupled layers.

This object is achieved with the magnetic head according to the invention, the magnetic head including an at least substantially flat magnetic coil having at least one coil layer structure comprising an electrically conductive winding, and further including a permanent-magnetic layer structure extending substantially parallel to the coil layer structure and having an in-plane magnetic axis. Due to the applied measures, the magnetic head according to the invention provides, during use, a time-varying perpendicular field generated by the coil layer structure and a static in-plane bias field generated by the permanent-magnetic layer structure. Suitable materials for the permanent-magnetic layer are, e.g., CoPt or FePt alloys; Co/Pt or Co/Pd multilayers; $Nd_2Fe_{14}B$ or $Co_5Sm$ rare earth transition metal compounds.

The nucleation of small reversed areas in the readout layer of a MAMMOS medium during an initial stage of the readout process, mainly occurs in an area where the stray field is strongest and the stray field direction deviates from the perpendicular direction, so the in-plane stray field component can exert a torque on the perpendicular magnetization in the readout layer to induce nucleation. During readout by means of known devices, nucleation will, therefore, start, not adjacent to the center of a mark, but adjacent to the mark/non-mark and non-mark/mark transitions. This leads to a broadening of the detection area and thereby to erroneously copied domains during high resolution readout.

By using the magnetic head according to the invention, an external field with a magnetic field component in a track direction and of sufficient strength, can be generated in order to suppress the disadvantageous effect of erroneously copied domains. The last-mentioned magnetic field component increases the nucleation of the mark/non-mark transition and reduces the nucleation of a non-mark/mark transition or vice versa depending on the direction of the in-plane field component. Combining the resulting tilted field with the copy window movement during readout, leads to a reduced Bit Error Rate for small marks and non-marks. An effect of the structure in accordance with the invention is furthermore that an in-plane field component can enhance the initial domain expansion speed, which is advantageous for high data rates. Apart from the above-defined effects, the magnetic head according to the invention has the advantage that no current is required to generate the in-plane bias field so that heat dissipation can be kept limited.

To obtain high data rates during LP-MFM recording and MAMMOS readout or the like, the magnetic coil should be small and close to the medium. The measures in accordance with the invention are particularly advantageous in a so-called First-Surface or Cover-Layer incident recording configuration, where the coil and the optical focusing system are present at the same side of the magneto-optical medium, and a laser spot is focused through the coil. In this context, an embodiment of the magnetic head according to the invention is characterized in that the magnetic coil has a central area and the conductive winding extends around this central area, and in that the permanent-magnetic layer structure includes two flat permanent magnets located at opposite sides of the central area of the magnetic coil. The magnets have the same magnetization direction to generate the desired in-plane field in the central area of the magnetic coil. This embodiment offers the possibility of obtaining a tilted field over a relatively large fraction of the central area of the coil during use without this central area being covered. The central area may be a transparent inner area or an inner aperture. In the case of substrate incident recording, where the magneto-optical medium extends between the coil and the optical focusing system and a laser beam does not pass the coil, an embodiment may be advantageous in which the magnetic coil has a central area and the conductive winding extends around this area, the permanent magnetic layer structure including a permanent magnet located in the central area.

An embodiment of the magnetic head according to the invention which can generate a very strong in-plane field in the medium, is characterized in that the permanent-magnet layer structure is situated at a side of the coil layer structure, this side being turned to a head face which is to be positioned opposite a main surface of the storage medium. Said head face may be formed by, or may include, a head face extending at least partly parallel to the coil layer structure. The magnetic field generated during use of this embodiment may increase near the edges of the permanent-magnet layer structure, however, this accidental effect hardly affects the readout process because the medium is not heated in the relevant region.

An alternative embodiment which does not have the above-described accidental effect, is characterized in that the permanent-magnet coil structure is situated at a side of the coil structure, this side being turned away from the head face. This configuration, in which the magnetic coil extends between the permanent-magnet layer structure and the head face, may be preferred in spite of the possibly somewhat weaker in-plane field.

A further alternative embodiment is characterized in that the permanent-magnetic layer structure and the coil layer structure are situated in the same plane, the coil layer structure extending between a pair of permanent magnets of the permanent-magnet layer structure. This embodiment with co-planer structures is advantageous, in particular, if the desired in-plane field component is required across a relatively large area at a relatively large distance from the coil layer structure.

Depending on the dimensions of the central area of the magnetic coil and/or, the distance of the coil to the medium during use, a soft magnetic layer structure, extending substantially parallel to the coil layer structure, can be advantageous in enhancing the field in the storage medium generated by the coil. For this reason, an embodiment of the magnetic head according to the invention is provided with such a soft magnetic layer structure. In such an embodiment, the coil layer structure may extend between the permanent-magnet layer structure and the soft magnetic layer structure, or the soft magnetic layer structure may be situated at a side of the coil layer structure, this side being turned away from the head face. The soft magnetic layer structure improves the efficiency of the conductive winding. Moreover, in particular, if the permanent-magnet layer structure and the coil layer structure are situated in the same plane, the efficiency of the permanent magnets is improved by the soft magnetic layer structure. The soft magnetic layer structure may be a continuous soft magnetic film in the case of a recording configuration where the magnetic coil is situated at one side of the medium and the laser beam is focused to a spot through the substrate of the storage medium. Otherwise, the soft magnetic layer structure may be formed as an interrupted soft magnetic film. Suitable soft magnetic materials for the soft magnetic layer structure are, e.g., NiFe or CoZrNb or FeTaN alloys.

A solid metallic permanent-magnet film as the permanent-magnet layer structure may give rise to eddy currents, which may be induced when the coil is operated at high frequencies. An embodiment of the magnetic head according to the invention in which the generation of eddy currents is minimized, is characterized in that the permanent-magnet layer structure is a laminated layer-structure having at least one electrically non-conductive intermediate layer. The magnetic material may be, e.g., a CoPt alloy, and the insulation material may be, e.g., $SiO_2$. Eddy currents as well as a capacitive coupling of the magnetic coil to the permanent-magnet layer structure may also be counteracted by configuring the permanent-magnet layer structure in the form of small magnetic stripes alternating with non-magnetic small stripes instead of one magnetic film, thus resulting in a structure having a stripy pattern.

The invention further relates to a slider for use in a magneto-optical device. The slider, according to the invention, includes the magnetic head according to the invention. The slider has a slider-body with which the magnetic head is integrated.

Furthermore, the invention relates to an optical recording and/or reproducing head having an objective provided with the magnetic head according to the invention. The objective, which serves for focusing and/or tracking, may be moved by actuating means known per se.

The invention also relates to a magneto-optical device, the device including the magnetic head according to the invention or the slider according to the invention or the optical head according to the invention.

To conclude, the invention relates to a method of reading out information present in a track of a magneto-optical medium having magneto-statically coupled or exchange coupled layers including a storage layer and a readout layer. When the method is carried out, a laser beam is focused to a spot in the readout layer, and an external magnetic field is applied. The method according to the invention is characterized in that use is made of a permanent magnet for generating a magnetic field component in the medium, particularly in the readout layer, in a direction of the track. The method according to the invention is based on the same insight as previously explained. Preferably, the magnetic head according to the invention, or the slider according to the invention, or the optical head according to the invention, is used for carrying out the method.

The above mentioned and other aspects of the invention are apparent from and will be elucidated, by way of non-limitative example, with reference to the embodiments described hereinafter.

DESCRIPTION OF THE PREFERRED EMBODIMENTS

Figure 1:
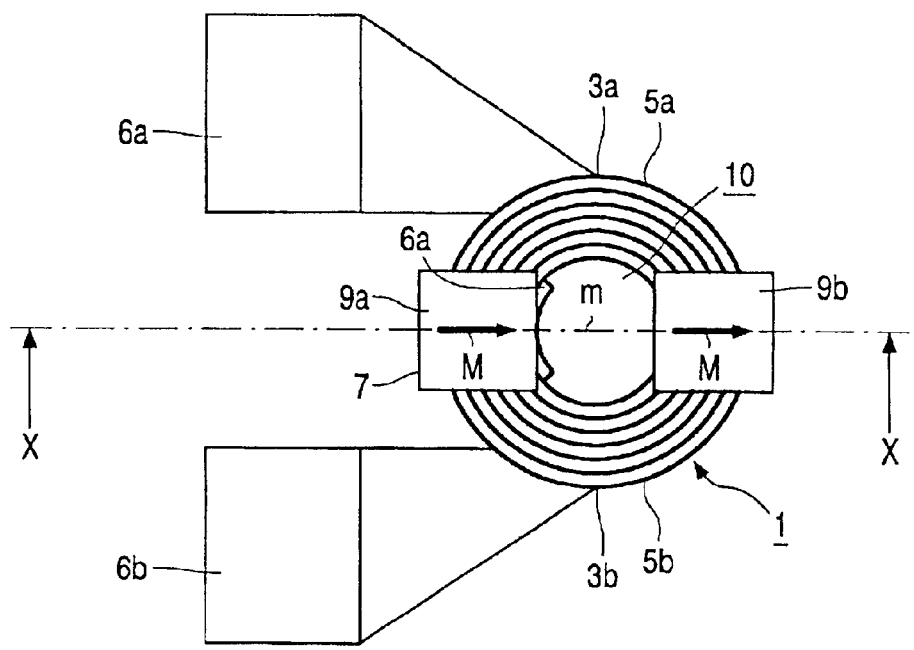
FIG. 1 is a diagrammatic plan view which shows the principle of the magnetic head in accordance with the invention, meant for use in a magneto-optical device.

The component diagrammatically shown in FIG. 1 is meant for use in a magneto-optical device, in particular, a device by means of which MAMMOS readout can be carried out. The component is formed by a magnetic head in accordance with the invention. The component includes an at least substantially flat magnetic coil 1 having at least one coil layer structure, this structure comprising an electrically conductive winding. In this example, the coil 1 has two coil layer structures 3a and 3b, each comprising a conductive winding 5a and 5b, respectively. Each of the windings 5a and 5b has a connecting surface 6a and 6b, respectively, the windings being electrically interconnected by an interconnection 6c. The material of the windings may be a metal, like Cu or Au. The component further includes a permanent-magnet layer structure 7, which extends substantially parallel to the coil layer structures 3a and 3b and has an in-plane magnetic axis m. The magnetic coil 1 has a middle or central area 10, the conductive windings 5a and 5b extending around the central area 10. The area 10 may be transparent. The permanent-magnet layer structure 7 includes two flat permanent magnets 9a and 9b located at opposite sides of the central area 10 of the magnetic coil 1. The two magnets 9a and 9b have the same magnetization direction M for generating an in-plane magnetic field in the central area 10 of the coil 1. The permanent-magnet may be formed of, e.g., a CoPt alloy. A desired tilting angle of the flux lines for MAMMOS readout can be attained by optimizing the position and/or dimensions and/or the composition of the magnets 9a and 9b, e.g., by changing the distance between the magnets, varying their thickness, varying the permanent-magnet material.

Figure 2:
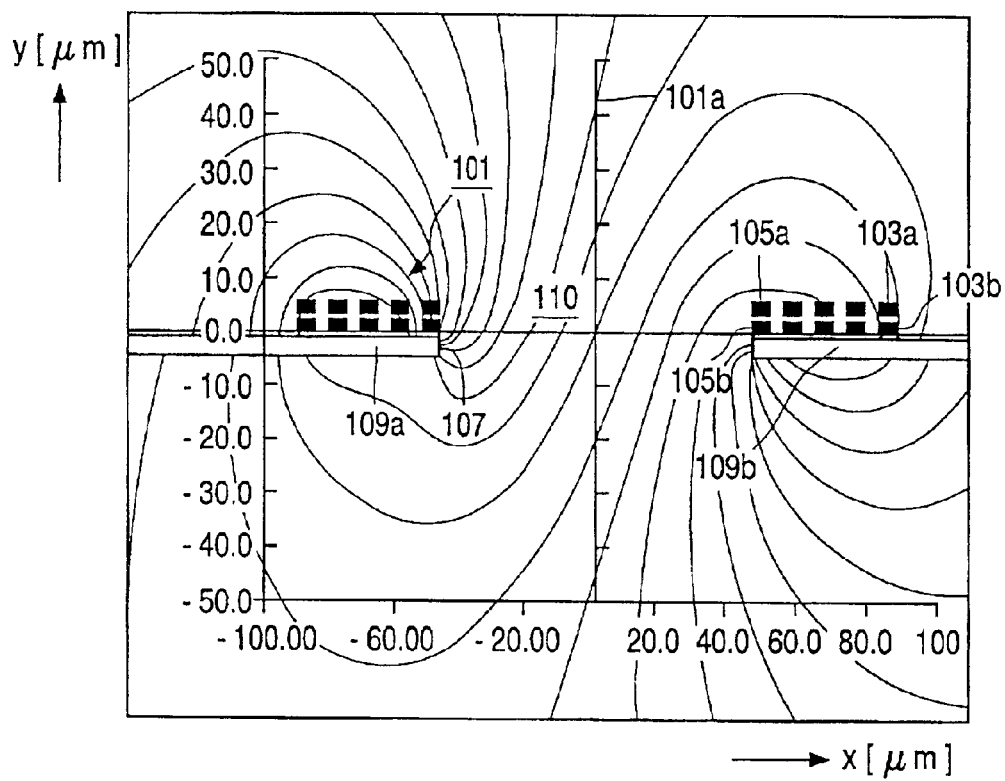
FIG. 2 is a graph representing the flux lines in an embodiment of the magnetic head in accordance with the invention in a cross-sectional area as indicated by the X—X in FIG. 1.

FIG. 2 shows the flux lines in a cross-sectional area of a typical configuration during use and indicates that a tilting of the field by about 45 degrees can be obtained in the central area of the magnetic coil. The coil 101 used in this configuration is a so-called dual-layer magnetic coil, i.e., a coil having two coil layer structures 103a and 103b, which each comprise an electrically conductive winding 105a and 105b, respectively. The coil 101 has a coil axis 101a. Apart from the coil 101, the configuration includes a permanent-magnet layer 107 including two flat permanent magnets 109a and 109b located at opposite sides of the central area, here indicated by 110, these magnets having the same magnetization direction M. In this example, the permanent-magnet layer 107 has a thickness of 3 $\mu$m and is formed of a CoPt alloy. The distance between the two magnets 109a and 109b is about 90 $\mu$m. It is possible to obtain a magnitude of the magnetic field of at least 15 kA/m in the central area and such a magnitude has proven to be sufficient for MAMMOS readout.

Figure 3A:
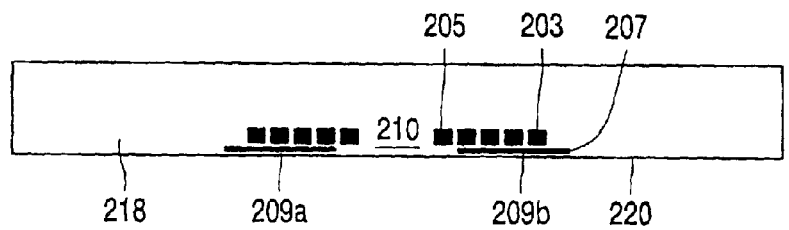
FIGS. 3A–3C and 4–7 diagrammatically show several embodiments of the magnetic head or the slider in accordance with the invention in sectional views similar to the sectional view taken on the line X—X in FIG. 1.
Figure 3B:
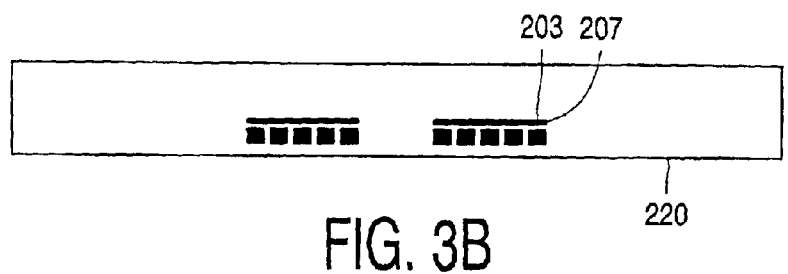
Figure 3C:
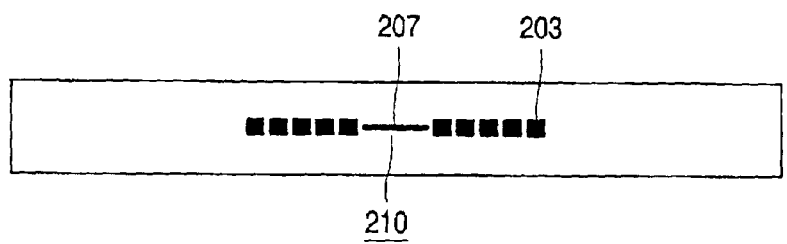

The embodiment shown in FIG. 3A, which is a slider in accordance with the invention but which may be a magnetic head in accordance to the invention, includes a coil layer structure 203 comprising an electrically conductive winding 205 and further includes a permanent-magnet layer structure 207 comprising two flat permanent magnets 209a and 209b located at opposite sides of a central area 210. The embodiment has a slider-body 218 having a face 220, herein also referred to as the head face, which is to be positioned opposite a main surface of a magneto-optical storage medium during use. In this example, the permanent-magnet layer structure 207 is situated at a side of the coil layer structure 203 which is turned to the head face 220. In other words, the permanent layer structure extends between the coil layer structure and the head face. It will be clear that in this embodiment, a slider and a magnetic head form an integral unit or component. The embodiment shown in FIG. 3B includes a permanent-magnet layer structure 207 which extends parallel to a coil layer structure 203 at a side thereof which is remote from a head face 220. The embodiment shown in FIG. 3C includes a permanent layer structure 207, which is present in a central area 210 of a coil layer structure 203.

Figure 4:
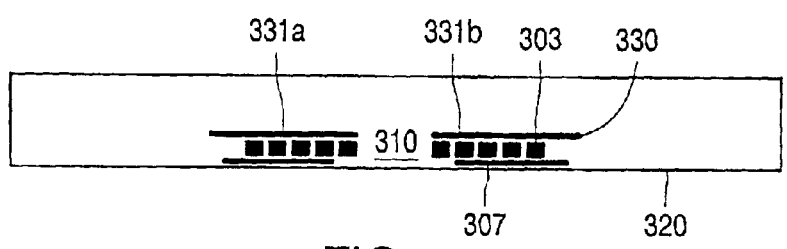

The embodiment shown in FIG. 4 includes a coil layer structure 303, a permanent-magnet layer structure 307 and a soft magnetic layer structure 330, including two soft magnetic layer portions 331a and 331b in order to make it possible to create a transparent central area 310. This is required if a laser-beam is led through the magnetic coil during a recording and/or readout process. All these layer structures are parallel to each other, the coil layer structure 303 extending between the layer structures 307 and 330. The soft-magnetic layer structure 330 is situated at a side of the coil layer structure 303 which is remote from a head face 320. The soft-magnetic layer structure may be formed of, e.g., a NiFe alloy.

Figure 5:
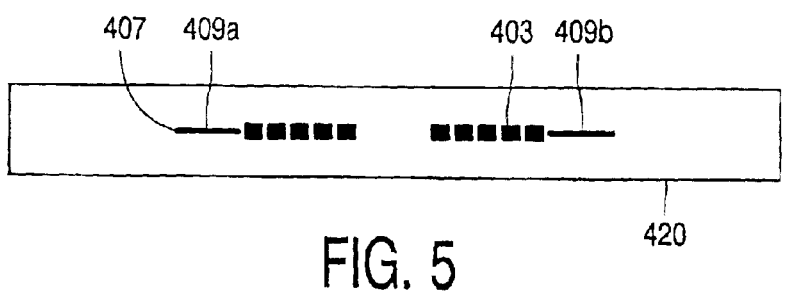

The embodiment shown in FIG. 5 has a head face 420 and includes a coil layer structure 403 and a permanent-magnetic layer structure 407 both lying in one and the same plane extending parallel to the head face 420. The permanent-magnet layer structure 407 has at least one pair of magnets 409a and 409b, the structure 407 extending between the magnets 409a and 409b.

Figure 6:
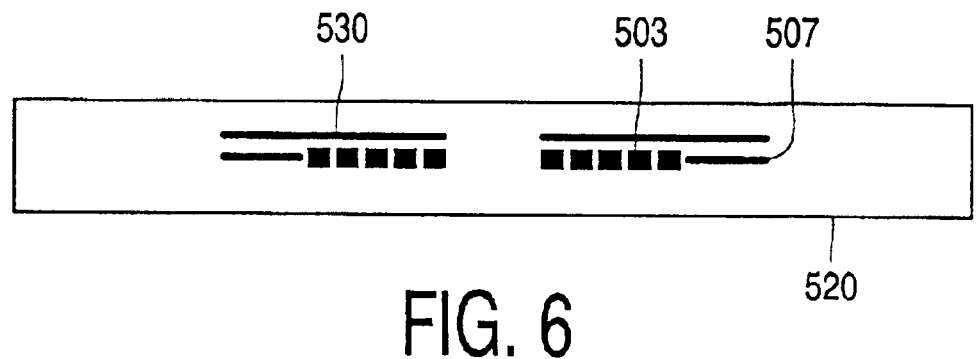

The embodiment shown in FIG. 6 resembles the embodiment shown in FIG. 5, but is additionally provided with a soft-magnetic layer structure 530 extending parallel to a head face 520 and arranged in such a manner that a coil layer structure 503 and a permanent-magnet layer structure 507 extend between, on the one side, a soft-magnet layer structure 530 and, on the other side, the head face 520.

Figure 7:
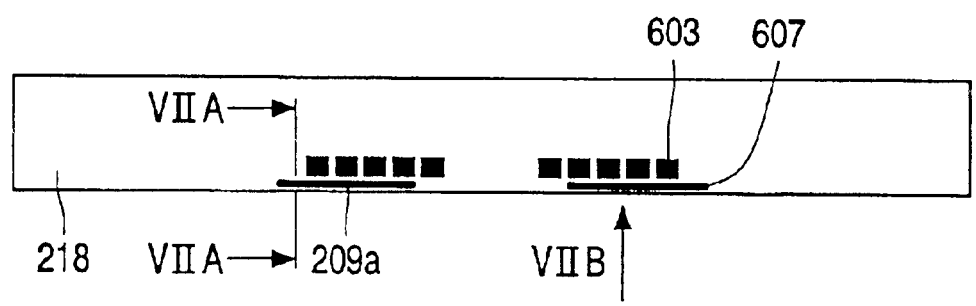
Figures 7A, 7B:
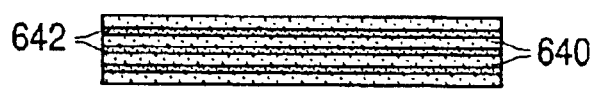
FIG. 7A is a diagrammatic cross-sectional view taken on the line VIIA—VIIA in FIG. 7.
FIG. 7B is a diagrammatic plan view as indicated by the arrow VIIB in FIG. 7.

The embodiment shown in the FIGS. 7, 7A and 7B includes a coil layer structure 603 and a permanent-magnet layer structure 607 which extend parallel to one another. In order to prevent eddy currents in the permanent-magnet layer structure 607, this layer is laminated in such a way that sub-layers 640 of a permanent-magnetic material, such as, e.g., a CoPt alloy, alternate with intermediate layers 642 of a non-conducting material, such as, e.g., quartz.

Figure 8:
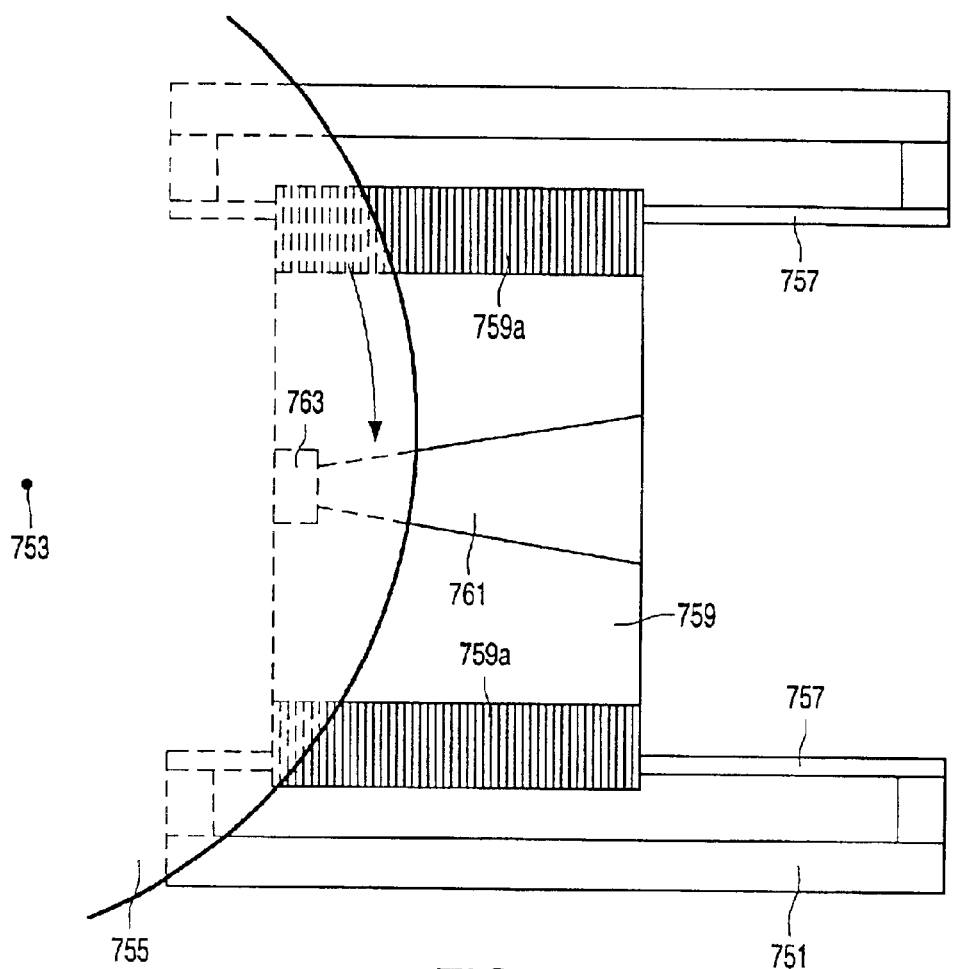
FIG. 8 diagrammatically shows an application of the magnetic head in accordance with the invention.

The embodiment of the magneto-optical device, in accordance with the invention shown in FIG. 8, has a frame 751 which rotatably supports a spindle 753 for a magneto-optical (MO) disc 755 and has two magnetic yokes 757 of a slide drive secured to it. The slide drive further includes two drive coils 759a which cooperate with the magnetic yokes. The drive coils 759a form parts of a slide 759 capable of performing radial translational movements with respect to the spindle 753. The slide 759 has a spring suspension 761, which carries an embodiment 763 of the slider in accordance with the invention, e.g., the slider shown in FIG. 3. The device shown in FIG. 8 can be used for carrying out the read-out method in accordance with the invention. According to this method, information present in a track of a magneto-optical storage medium having magnetostatically coupled layers is read out by means of a laser spot and an external magnetic field, a permanent magnet, particularly formed by said permanent-magnetic layer structure, being used for generating a magnetic field component in the storage medium in a direction of the track. Thus, by the use of a planar magnetic field modulation coil in combination with a structured permanent-magnet layer, a high-resolution and low bit-error-rate MAMMOS readout is attained.

Figure 9:
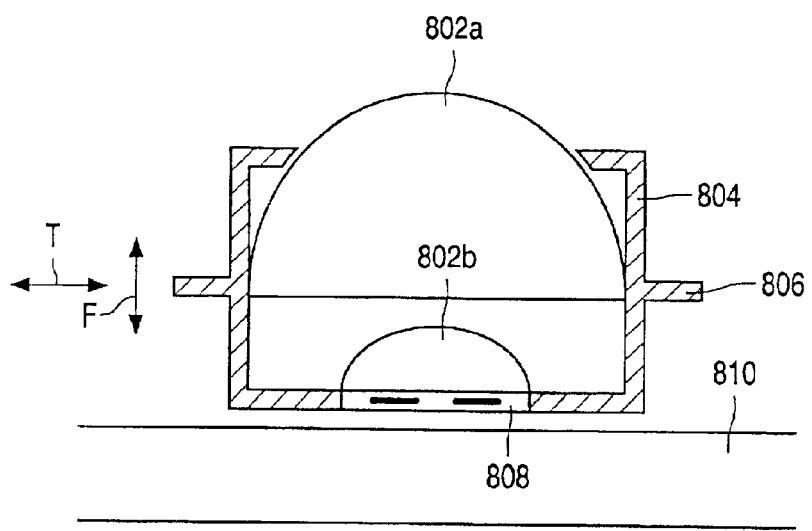
FIG. 9 is a diagrammatic cross-sectional view of an optical head in accordance with the invention.

The embodiment of the optical recording and/or reproducing head shown in FIG. 9 may be a part of a magneto-optical apparatus and has an objective including an objective lens 802a and a front lens 802b. The objective 802a, 802b is fixed in a frame 804 having a support 806 for an actuator element of a focus and/or tracking actuator. The objective, particularly the front lens 802b thereof, is provided with an embodiment 808 of the magnetic head according to the invention, e.g., the magnetic head shown in FIG. 7. By means of said actuator, the front lens 802b with the magnetic head 808 is capable of performing focus movements F and/or tracking movements T with respect to an MO disc 810.

It is to be noted that the invention is not limited to the examples shown herein. Thus, the magnetic coil may have more than one or two coil layers, or coil layer structures. Moreover, it is possible to use a magnetic head in accordance with the invention secured to or mounted on a slider, instead of a magnetic head integrated in the slider. Furthermore, the MO device can be provided with a swing arm instead of or additional to a slide.

It is to be noted further that the measures as defined in this patent document can be advantageously combined with the measures disclosed in European Patent Application No. 00201412.4, corresponding to U.S. Pat. No. 6,628,604 (PHNL000221 EPP), incorporated herein by reference. This means that the flat magnetic coil may have parallel coil layers, each of the coil layers having a turn arranged around the central area of the coil. At least one of the coil layers may have turns, of which the turns closer to the central area have smaller widths than the turns further away from the central area, while at least one of the coil layers has an outermost turn situated closer to the central area than the outermost turn of one of the other coil layers. Such a coil structure has a limited capacitance, while the power dissipation is also limited.

What is claimed is:

1. A magnetic head for use in a magneto-optical device, said magnetic head including an at least substantially flat magnetic coil having at least one coil layer structure comprising an electrically conductive winding, said magnetic head further including a permanent-magnet layer structure extending substantially parallel to the coil layer structure and having an in-plane magnetic axis.

2. The magnetic head as claimed in claim 1, the magnetic coil having a central area and the conductive winding extending around the central area, wherein the permanent-magnet layer structure includes two flat permanent magnets located at opposite sides of the central area of the magnetic coil.

3. The magnetic head as claimed in claim 1, the magnetic coil having a central area and the conductive winding extending around the central area, wherein the permanent-magnet layer structure includes a permanent magnet located in the central area.

4. The magnetic head as claimed in claim 1, wherein said magnetic head further comprises a head face extending at least partly parallel to the coil layer structure, and wherein the permanent-magnet layer structure is situated at a side of the coil layer structure, said side being remote from the head face.

5. The magnetic head as claimed in claim 1, wherein said magnetic head further comprises a head face extending at least partly parallel to the coil layer structure, and wherein the permanent-magnet layer structure is situated at a side of the coil structure, said side being situated nearer the head face.

6. The magnetic head as claimed in claim 1, wherein said magnetic head further comprises a head face extending at least partly parallel to the coil structure, and wherein the permanent-magnet layer structure and the coil layer structure are situated in one plane, the coil layer structure extending between at least two permanent magnets of the permanent-magnet layer structure.

7. The magnetic head as claimed in claim 1, wherein said magnetic head further comprises a soft magnetic layer structure extending substantially parallel to the coil layer structure.

8. The magnetic head as claimed in claim 7, wherein the coil layer structure extends between the permanent-magnet layer structure and the soft magnetic layer structure.

9. The magnetic head as claimed in claim 8, wherein said magnetic head further comprises a head face extending at least partly parallel to the coil layer structure, and wherein the soft magnetic layer structure is situated at a side of the coil layer structure, said side being remote from the head face.

10. The magnetic head as claimed in claim 1, wherein the permanent-magnet layer structure is a laminated layer structure having at least one electrically non-conductive intermediate layer.

11. A slider for use in a magneto-optical device and including the magnetic head as claimed in claim 1.

12. The slider as claimed in claim 11, wherein said slider further comprises a slider-body, the magnetic head being integrated with the slider-body.

13. An optical recording and/or reproducing head having an objective provided with the magnetic head as claimed in claim 1.

14. A magneto-optical device including the magnetic head as claimed in claim 1.

15. A method of reading out information present in a track of a magneto-optical storage medium having magnetostatically coupled or exchange coupled layers by means of a laser spot and an external magnetic field, wherein use is made of a permanent magnet for generating a magnetic field component in said medium in a direction of the track, wherein use is made of a magneto-optical device having a magnetic head that includes:

an at least substantially flat magnetic coil having at least one coil layer structure including an electrically conductive winding, and a permanent-magnet layer structure extending substantially parallel to the coil layer structure and having an in-plane magnetic axis.

* * * * *